United States Patent [19]

Makihara

[11] Patent Number: 4,743,972

[45] Date of Patent: May 10, 1988

[54] IMAGE INPUT APPARATUS

[75] Inventor: Yachiyo Makihara, Nagoya, Japan

[73] Assignee: Brother Kogyo Kabushiki Kaisha, Nogoya, Japan

[21] Appl. No.: 68,440

[22] Filed: Jun. 30, 1987

[30] Foreign Application Priority Data

Jun. 30, 1986 [JP] Japan .................................. 61-151607

[51] Int. Cl.$^4$ ............................................... H04N 3/14
[52] U.S. Cl. .............................. 358/213.11; 358/209; 358/41
[58] Field of Search ................... 358/213.11, 225, 236, 358/211, 210, 209, 55, 41, 909

[56] References Cited

U.S. PATENT DOCUMENTS

| | | | |
|---|---|---|---|
| 4,093,976 | 6/1978 | Das | 358/53 |
| 4,100,573 | 7/1978 | Berger | 358/113 |
| 4,209,803 | 6/1980 | Guyot | 358/110 |
| 4,229,766 | 10/1980 | Sipos | 358/209 |
| 4,348,611 | 9/1982 | Ruppel et al. | 313/388 |
| 4,400,725 | 8/1983 | Tanigaki | 358/85 |
| 4,471,378 | 9/1984 | Ng | 358/110 |
| 4,480,269 | 10/1984 | Yoshida et al. | 358/209 |
| 4,489,351 | 12/1984 | d'Alayer de Costemore d'Arc | 358/213 |

*Primary Examiner*—Robert Lev
*Attorney, Agent, or Firm*—Kane, Dalsimer, Sullivan, Kurucz, Levy, Eisele and Richard

[57] ABSTRACT

Disclosed is an image input apparatus which comprises a liquid crystal panel disposed under an original mount and provided with a liquid crystal and a photo absorption agent sealed therein, electrodes arranged in a matrix on each of upper and lower opposite surfaces of the liquid crystal panel, and a light source disposed above the original mount so as to send light onto an original mounted on the original mount so that light from the original is projected onto the crystal panel so as to make the liquid crystal panel to store picture image information on the original as a change in phase of the liquid crystal, the picture image information stored in the liquid crystal panel being electrically read out by the electrodes. Preferably, the liquid crystal panel is further provided dichromatic coloring matters sealed therein.

4 Claims, 2 Drawing Sheets

IMAGE INPUT APPARATUS

BACKGROUND OF THE INVENTION

1. Field of the Invention

The present invention relates to an image input apparatus for entering image data by means of a memory type matrix liquid crystal display device.

2. Description of Prior Art

When image data are entered, a special consideration is required unlike the case of input of general data such as characters, marks, and so on, through a key board. This is because it is necessary to enter image data while forming the image data unlike the general data such as characters, marks, and so on, where are formed in advance.

In a conventional image input apparatus, when an existing a logo, a mark, or the like, was entered, the input operation was performed by manually tracing it with a light pen. In such a way of input, not only time and labor were taken, but satisfactory could not been obtained on the finished work.

SUMMARY OF THE INVENTION

It is therefore an object of the present invention to provide an image input apparatus in which it is possible to easily enter data of an image such as a logo, a mark, or the like, drawn on a transparent sheet or formed by slits.

In order to achieve the above object, according to the present invention, the image input apparatus comprises: an original mount; a liquid crystal panel disposed under the original mount, the liquid crystal panel having a liquid crystal and a photo absorption agent sealed in the liquid crystal panel; electrodes arranged in a matrix on each of upper and lower opposite surfaces of the liquid crystal panel; and a light source disposed above the original mount so as to emit light onto an original mounted on the original mount so that light from the original is projected onto the crystal panel so as to make the liquid crystal panel to store picture image information on the original as a change in phase of the liquid crystal, the picture image information stored in the liquid crystal panel being electrically read out by the electrodes.

Preferably, dichromatic coloring matters are further sealed in the crystal panel.

BRIEF DESCRIPTION OF THE DRAWINGS

The above and other objects, features, and advantages of the present invention will be more apparent from the following description with reference to the accompanying drawings, in which.

DESCRIPTION OF PREFERRED EMBODIMENT

Referring to the accompanying drawings, a preferred embodiment according to the present invention will be described hereunder.

Figure 1:
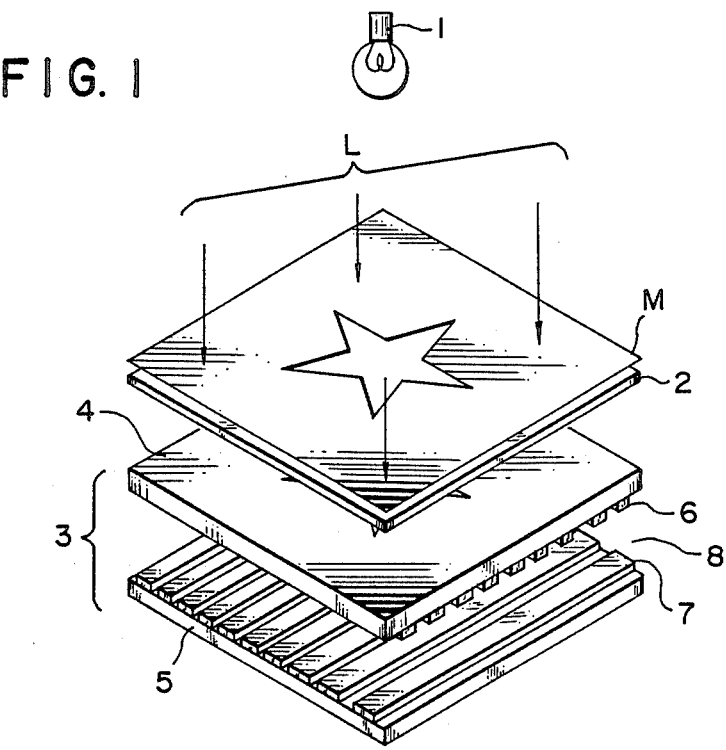
FIG. 1 is a perspective view showing a basic structure of the image input apparatus according to the present invention.
Figure 2:
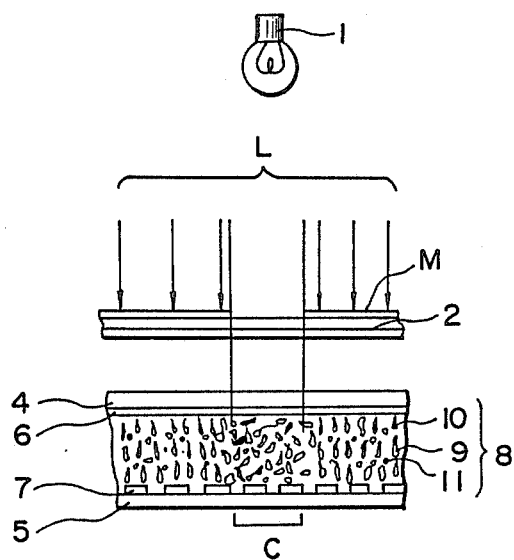
FIG. 2 is a cross section showing a structure of the image data input apparatus according to the present invention.

Referring to FIGS. 1 and 2, the main portion of the image input apparatus according to the present invention is constituted by a light source portion 1 for forming parallel light rays L of a specific wave-length, an original mount portion 2 for mounting an original M, and an information write/read portion 3. The information write/read portion 3 is constituted by a pair of glass plates 4 and 5, electrodes 6 and 7 arranged in a matrix state and closely attached on opposite surfaces of the respective glass plates 4 and 5, and a liquid crystal 8 sealed in a space between the electrodes 6 and 7 so as to be sandwiched therebetween. Orientation films for keeping an initial state of the liquid crystal goods are formed on the inside surfaces of the respective glass plates 4 and 5, while not illustrated in the drawings.

In this embodiment, a light source arranged to radiate infrared rays of 830 nm is used in the light source portion 1, and a liquid crystal panel utilizing a thermoelectric optical effect of a smectic A phase liquid crystal is used in the information write/read portion 3. The liquid crystal 8 includes elongated liquid crystal molecules 9 depicted in white, elongated dichromatic coloring matters 10 depicted in black, and infrared-ray absorption agent 11 depicted by white circles.

A liquid crystal material of the layer of the liquid crystal 8 used in the liquid crystal panel remains in the state of smectic A phase liquid crystal in a room temperature, however, when the temperature rises up to about 50° C., the crystal material is inverted into an isotropic liquid phase. The thermoelectric optical effect is a phenomenon which is caused by existence of en electric field during a process of rapidly heating/cooling a liquid crystal material to a temperature a little higher than the transition temperature.

The write operation is executed by selectively heating the layer of liquid crystal 8 in an initial state so as to make the temperature thereof exceed the transition temperature to thereby invert the layer of liquid crystal into the isotropic liquid phase. According to the present invention, the infrared light of 830 nm wave-length is blocked properly partly by the original M so as to transmit only a desired portion of the infrared light through the original M, and the energy of the light which has transmitted through the original M and reached the liquid crystal is absorbed by the infrared-ray absorption agent 11 to raise the temperature to thereby carry out the write operation. At that time, the liquid crystal molecules 9 (white particles in FIG. 2) and the dichromatic coloring matters 10 (black particles in FIG. 2) included in the liquid crystal molecules are in a random orientation, so that the layer of liquid crystal 8 looks colored as shown in a central range of C in FIG. 2. Then, being cooled rapidly, the liquid crystal material is inverted into the smectic A phase again resulting in an appearance of a strong scattered-state called a focal conic structure. The infrared-ray absorption agent 11 generally become into a random orientation so that they look black. The above-mentioned conditions are maintained for a long time by the memorizing property of the panel. The write operation can be carried out not only by transmitted light but by reflected light.

In this embodiment, the write operation is performed by partly blocking parallel light rays of a specific wave-length shown in FIG. 1, for example, 830 nm, by a slit structure of an original or the contents written on a transparent sheet while allowing the light rays to be transmitted through the original or the transparent sheet only a desired portion thereof. Thus, the write operation is carried out by the change in temperature caused when only the light rays transmitted through the transparent portion reaches the layer of liquid crystal material 8 so that the infrared-ray absorption agent 11 are heated to raise the temperature. Accordingly, the operation for writing a logo, a mark, or the like, can be carried out in a very short time, and the written state by the write operation can be confirmed in the form of a picture. Further, the liquid crystal panel carrying data written therein can be initialized only by applying an electric filed to the panel through the electrodes 6 and 7.

Reading of the contents written in the panel is carried out by utilizing a difference in dielectric constant of the liquid crystal molecules 9 between in the long and short axes. That is, variations are caused in apparent electrostatic capacity depending on the variations in orientation of the liquid crystal molecules, and reading is performed as a ratio of capacitance. Let the capacitance ratio be $R_c$, the capacitance in the non-written state be $C_{uw}$, and the capacitance in the written state be $C_w$, then there is the following relation among them.

$$R_c = C_{uw}/C_w$$

Figure 3:
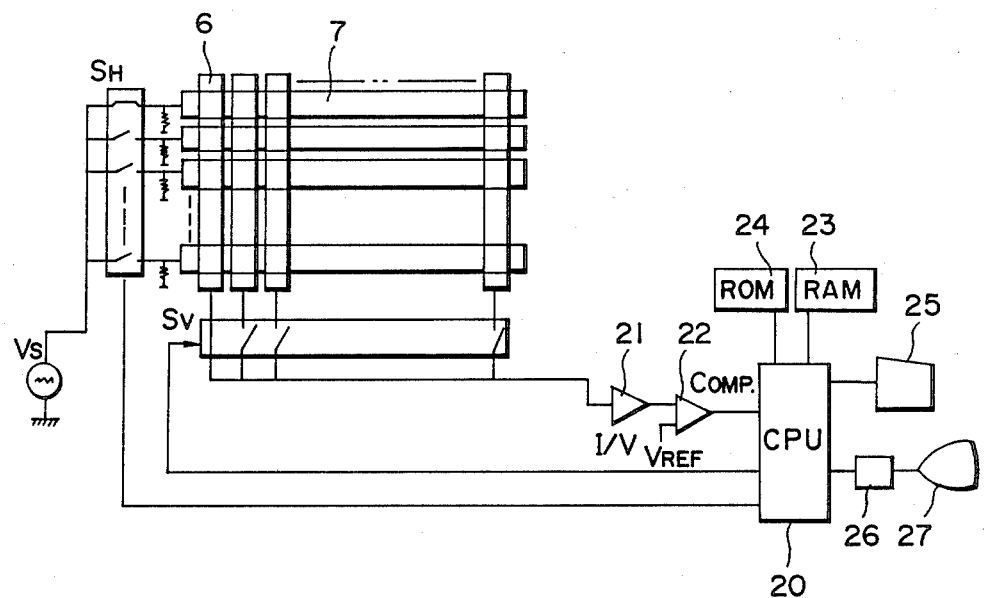
FIG. 3 is an electric connection diagram of an apparatus in which an information write/read portion of the image data input apparatus according to the present invention is applied to a word processor.

FIG. 3 shows an example of an electric connection circuit of the information write/read portion. The information write/read into/from the panel portion is performed through the electrodes 6 and 7 arranged in a matrix. Vertical switches $S_v$ are respectively connected to the vertical electrodes 6 and the horizontal switches $S_h$ are connected to the horizontal electrodes 7.

When the written data are to be read out in the form of an electric signal, the vertical switches $S_v$ and the horizontal switches $S_h$ are successively turned on one by one by a command applied thereto from a CPU 20 so that a signal supplied from a signal generator S is passed through the turned-on horizontal switch $S_h$, the liquid crystal material 8, and the turned-on vertical switch $S_v$. An output current signal from the turned-on vertical switch $S_v$ is passed through a current-to-voltage conversion circuit I/V converter 21. The output of the I/V converter 21 is compared with a reference voltage $V_{REF}$ in a comparator 22. The output of the comparator 22 is controlled so as to be stored in a random access memory (RAM) 23. The CPU 20 is provided with a read only memory (ROM) 24 and a key board 25, and further, is connected to a display 27 through a display controller 26. The written data may be displayed on the display 27.

The image input apparatus according to the present invention may be used as an input device in the case where, for example, a not-stored character is entered into a word processor. Further, the image input apparatus can be utilized as a screen of an overhead projector (OHP) so as to enter a projection chart of the OHP sheet as it is.

In the image input apparatus according to the present invention, if an original carrying a desired logo, a mark, or the like, formed thereon in advance by slitting on an opaque substance or by manually writing on a transparent sheet is mounted on an original mount portion, the original can be automatically read into the apparatus to form desired image data. The data entered through the image input apparatus can be confirmed in the form of a picture. Trouble and time required for input operation can be reduced, and good finish can be obtained.

What is claimed is:

1. An image input apparatus comprising:
   an original mount;
   a liquid crystal panel disposed under said original mount, said liquid crystal panel having a liquid crystal and a photo absorption agent sealed in said liquid crystal panel;
   electrodes arranged in a matrix on each of upper and lower opposite surfaces of said liquid crystal panel; and
   a light source disposed above said original mount so as to emit light onto an original mounted on said original mount so that light from said original is projected onto said crystal panel so as to make said liquid crystal panel to store picture image information on said original as a change in phase of said liquid crystal, said picture image information stored in said liquid crystal panel being electrically read out by said electrodes.

2. An image input apparatus according to claim 1, in which dichromatic coloring matters are further sealed in said crystal panel.

3. An image input apparatus according to claim 1, in which said liquid crystal panel utilizing a thermoelectricity optical effect.

4. An image input apparatus according to claim 1, in which said photo absorption agent is infrared absorption agent and said light source emits infrared rays.

* * * * *